Dec. 11, 1951  D. J. PYE ET AL  2,577,808
PRODUCTION OF CHLORINE
Filed Feb. 12, 1947
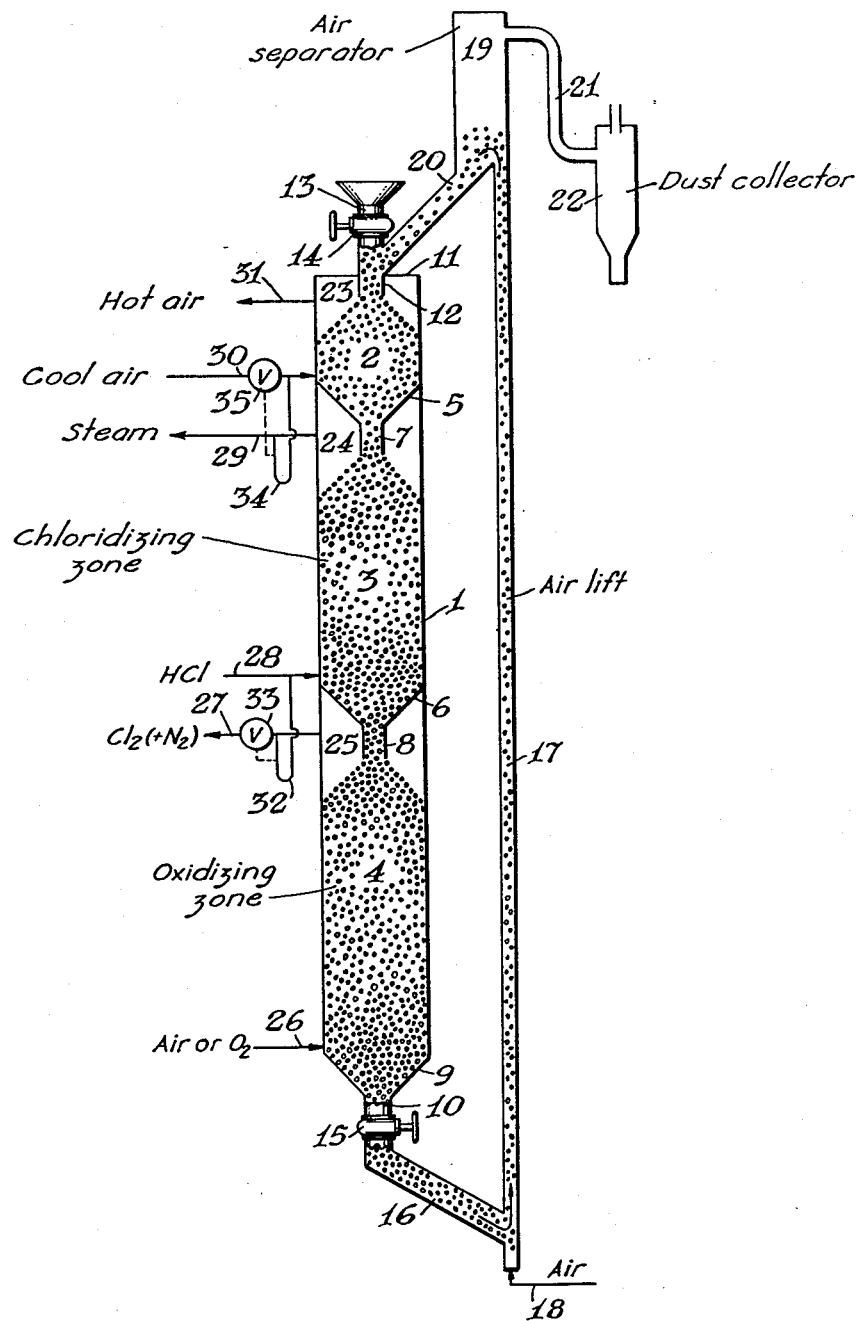
INVENTORS.
David J. Pye
William J. Joseph
BY
Griswold & Burdick
ATTORNEYS Patented Dec. 11, 1951

2,577,808

UNITED STATES PATENT OFFICE 2,577,808

PRODUCTION OF CHLORINE

David J. Pye and William J. Joseph, Pittsburg, Calif., assignors to The Dow Chemical Company, a corporation of Delaware Application February 12, 1947, Serial No. 728,098

4 Claims. (Cl. 23—219)

The present invention relates to the production of chlorine from hydrogen chloride (hydrochloric acid) by an indirect oxidation process. In particular it is concerned with an improved mode of procedure adapted for continuous operation, whereby a greater percentage conversion of hydrogen chloride is obtained than in the procedures disclosed by the prior art, as well as a higher concentration of chlorine in the immediate reaction product and a lower concentration of by-products and impurities.

The classical method for oxidizing hydrogen chloride to chlorine by means of air or oxygen is the Deacon process. The reaction of that process is represented by the equation:

$$4HCl + O_2 \rightleftharpoons 2Cl_2 + 2H_2O$$

The process depends upon the use of a catalyst, the usual one being cupric chloride. As is well known, the above equation represents a reversible reaction which cannot proceed to completion in the direction from left to right, but reaches an equilibrium which varies with the reaction temperature and other conditions. Under optimum conditions, the maximum degree of conversion of hydrogen chloride to chlorine, obtainable by the process, is about 70 per cent.

Various proposals have been made for modified procedures which are theoretically capable of avoiding the thermodynamic equilibrium of the so-called Deacon reaction, in order to make possible a higher yield of chlorine and to overcome some of the other disadvantages of the Deacon process. One such proposal, made over fifty years ago, consists of a two-stage operation involving the alternate formation of a metal chloride and oxide. Thus, the metal oxide, e. g. ferric oxide, is converted to the chloride in one stage by reaction with hydrogen chloride, and the metal chloride is oxidized with air or oxygen in the other stage to reform the metal oxide and liberate free chlorine, as illustrated by the equations;

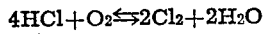
$$2Fe_2O_3 + 12HCl \rightarrow 4FeCl_3 + 6H_2O$$
$$4FeCl_3 + 3O_2 \rightarrow 2Fe_2O_3 + 6Cl_2$$

Such sequence of reactions leads theoretically to a complete conversion of hydrogen chloride to chlorine, but in the simple form shown is subject to operating difficulties and limitations, which make it impractical for commercial use. One of the most serious objections is that the oxidation of ferric chloride requires a high temperature at which ferric chloride is readily volatile, so that much of the latter is vaporized and removed from the reaction zone by the flow of gases before it can be oxidized.

It has been proposed in U. S. Patent No. 2,206,399 to overcome the foregoing and other difficulties of operating the said two-stage process by employing a contact mass which consists of four components: (1) a chlorine carrier, e. g. ferric chloride; (2) a depressant, e. g. potassium chloride, which, by double salt or eutectic formation or in some other way, depresses the volatility of ferric chloride; (3) a promoter, e. g. a chloride of a metal such as cadmium, lead, copper, nickel, cobalt, etc.; and (4) an inert porous support or carrier. By the use of such a contact mass the ferric chloride component can be oxidized by oxygen or air to the oxide at about 400° to 500° C. without serious vaporization loss, and the oxidized mass can be chloridized by contact with hydrogen chloride to convert the oxide back to the chloride at a temperature of about 300° C. or higher.

While the aforesaid 4-component contact mass overcomes a serious difficulty in working the two-stage porcess, the procedure as described in the patent suffers from limitations which militate strongly against its successful commercial use. As above indicated, the two stages of the process are preferably to be carried out in different temperature ranges; e. g. in the chloridization stage the temperature is normally lower than in the oxidation stage. In the use of a stationary bed of the contact mass an alternating mode of operation is called for, chloridization of the oxidized mass being carried on during one period at the lower temperature until the ferric oxide has been converted largely to the chloride, and oxidation of the chloridized mass then being carried on at the higher temperature until the ferric chloride has been converted to the oxide. Each periodic change of operation involves either the addition or removal of a large amount of heat from the bed before the next operation can proceed, which is not only wasteful of heat but causes loss of operating time. Again, the rate of reaction in each stage varies greatly with the degree of completion. Toward the end of the chloridizing stage considerable amounts of hydrogen chloride pass through the contact mass unreacted, and, being mixed with water vapor, are not readily or economically to be dried for recycling, hence are mainly a loss to the process and must be disposed of in other ways. Likewise, in the oxidation stage toward the end thereof, much oxygen passes through unreacted and dilutes the chlorine product, so that the strength of the chlorine produced, even when using pure oxygen, is only on the order of about 30 per cent by volume. During long-continued operation with a stationary bed of the

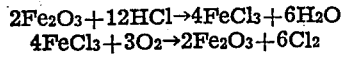

contact mass there is a gradual loss of activity, due for the most part to loss of ferric chloride by vaporization, for, although such losses are greatly reduced as compared with the art prior to the patent, nevertheless such vaporization losses are not entirely eliminated by use of the 4-component contact mass. Such losses cannot be made good satisfactorily during operation of the process, making it necessary to replace the contact mass at intervals, or to remove the used mass and rework it to restore its activity.

Both reactions involved in the two-stage process are exothermic, although not sufficiently so to maintain the reaction temperature under usual operating conditions without addition of heat from an external source, such as by preheating the feed gases. It is difficult to maintain a satisfactory temperature control in a stationary bed wherein an exothermic reaction is taking place, so as to prevent the occurrence of local "hot spots" or "cold channels," both of which may at times exist in the same bed.

From an economic standpoint, the ability of the patented process to compete successfully with other methods for making chlorine is for the most part dependent upon the use of oxygen or an oxygen-rich gas, instead of air, in the oxidation stage. Otherwise the chlorine produced is excessively diluted with inert gas, e. g. nitrogen, and the primary gas product is of too low concentration, on the order of about 12 per cent $Cl_2$, to be economically concentrated to a strong gas or liquid chlorine.

It is among the objects of this invention to devise a mode of operation for the aforesaid two-stage process which is capable of operating continuously, instead of periodically or intermittently, whereby to reduce heat losses, maintain more uniform operating temperatures, permit the maintenance of catalyst activity during operation and secure a higher overall yield of chlorine from hydrogen chloride. Another object is to provide a mode of operation, whereby a higher concentration of chlorine may be obtained in the product, to a degree such that air may be economically employed as the oxidizing agent. The foregoing and other advantages are secured through operation of the invention as shown and described in the following specification, taken in connection with the annexed drawing, in which the single figure is a diagrammatic arrangement of apparatus for carrying out the improved process of the invention.

In arriving at the solution of our problem we have adapted and applied the principle of a continuously moving bed of granular particles of the contact mass, traveling by gravity flow through the successive zones of chloridization and oxidation, wherein it passes in countercurrent flow with the respective gases, hydrogen and air or oxygen. The operation of our improved process is most clearly described with reference to the drawing.

A tower 1, conveniently but not necessarily circular in cross-section, is divided into three chambers or compartments 2, 3, 4 by sloping partitions 5 and 6, the partitions having a central opening enclosed by depending legs 7 and 8, respectively. The base of tower 1 is provided with a similarly sloping bottom 9 having a central opening and dependent leg 10, while the top of the tower is closed by cover 11 in which is a central opening and dependent leg 12. A feed pipe 13, controlled by valve 14, is mounted on cover 11 and communicates with leg 12. Leg 10 at the bottom is likewise controlled by valve 15, and the leg communicates with a downwardly sloping discharge conduit 16, which leads to the base of a standpipe 17. An air feed pipe 18 is connected at the bottom of standpipe 17, so that the latter serves as an air lift. At the top standpipe 17 opens into an air separator chamber 19, from the base of which a delivery conduit 20 slopes downwardly to connect with feed pipe 13 below the valve 14. From the top of separator chamber 19 a vent pipe 21 leads to a dust collector 22.

The chambers 2, 3 and 4 are charged with particles of the contact mass through inlet 13. The particles flow by gravity from top to bottom, in each chamber assuming an upper level below each of the legs 12, 7 and 8, as shown, according to the angle of repose. When the chambers are charged, opening the valve 15 at the bottom permits the charge to flow out through discharge conduit 16 into the base of standpipe 17, where the particles are lifted by air introduced through pipe 18, and raised to separator chamber 19, whence they return to chamber 2 through conduit 20. Thus a continuous circulation of the charge is produced. Dust formed by attrition of the circulating particles is carried away from separator chamber 19 through vent pipe 21 and collected in dust collector 22. Dust losses are replaced from time to time, as needed, by additions of fresh particles through inlet 13, valve 14 being normally closed except when particles of the contact mass are being fed to the system.

Above the level of the moving bed of particles in each of the chambers 2, 3 and 4 is a free space, indicated by the reference characters 23, 24 and 25, respectively. Each of these spaces is sealed from the next higher chamber or zone of the apparatus by the amount of the back pressure in the overlying column of particles, and serves to trap off gases rising through the bed of particles in the respective chamber. In the operation of the apparatus with continuous circulation of the contact mass, chamber 2 is a feed and surge chamber for the charge in the lower chambers, and may also be used as a heating or cooling chamber for the contact mass, as hereinafter described. Chamber 3 is the chloridization chamber, in which the iron oxide of the oxidized particles is converted to iron chloride by treatment with hydrogen chloride. Chamber 4 is the oxidation chamber, in which the chloridized particles are oxidized by air or oxygen.

For oxidizing the chloridized particles air or oxygen is introduced into the bottom of chamber 4 through pipe 26 and distributed by any suitable means through the cross-section of the moving bed of particles therein. The reacted gases from the oxidation collect in space 25 at the top of the chamber and are drawn off through pipe 27. Similarly, hydrogen chloride is introduced into the lower part of chamber 3 through pipe 28, and reacted gases are drawn off from space 24 through pipe 29. In chamber 2, when the same is used as a cooling chamber, cool air is introduced into the lower part through pipe 30, and hot air is withdrawn at the top through pipe 31. In starting the process chamber 2 may also be used to heat the charge to an operating temperature, by passing hot air or combustion gases through the same.

In order to prevent upward leakage of gas from chamber 4 into chamber 3, or from the latter into chamber 2, through legs 8 and 7, respectively, the relative gas pressure in the adjoining chambers is regulated so that pressure in the adjacent area of the upper chamber is equal to that in the lower chamber. This may be done, for example, by means of a manometer between the gas outlet of the lower chamber and the gas inlet of the upper chamber operatively connected in known manner for actuating a control device which regulates a valve in either of the pipes. Thus, manometer 32 is shown by dotted lines as being connected with control valve 33 in pipe 27, and manometer 34 is connected with control valve 35 in pipe 30.

Tower 1 and its chambers 2, 3 and 4 are equipped with heat insulation, as required. Preheaters (not shown) may be provided for the inlet gases, air (or $O_2$) and hydrogen chloride, respectively.

For operation of the process, the chambers are charged with the particles of the contact mass and circulation of the particles is established, as shown. Heat is supplied for heating the particles in chambers 2, 3 and 4 to a temperature sufficient to initiate the chemical reaction. Such heat may be supplied by passing hot air or combustion gases through the chambers to heat up the moving bed of particles therein. When the temperature of the oxidized particles in chamber 3 is raised sufficiently, to about 300°, for example, the flow of hydrogen chloride is started through inlet pipe 28, and the chloridizing reaction is established with a temperature range from about 475° C. in the lower part of the chamber decreasing to about 350° to 400° at the top. The hydrogen chloride may be preheated to any suitable temperature below reaction temperature which is convenient for maintaining the reaction temperature within the desired range. The feed rate of hydrogen chloride is set at a desired value and the flow of the moving bed of particles is adjusted, so that oxidized particles entering the chamber at the top are largely or substantially chloridized when they pass out at the bottom of the chamber. Under well regulated operating conditions 90 to 95 per cent or more of the hydrogen chloride fed to the chamber is consumed in chloridizing the oxidized particles. The reaction gases collected in space 24 and withdrawn through pipe 29 consist of steam and unreacted hydrogen chloride. These gases are cooled and condensed in usual manner to recover an aqueous hydrochloric acid solution.

When chamber 4 has become charged with chloridized particles, air or oxygen is admitted through pipe 26, and its flow adjusted as required to oxidize the chloridized particles during passage through the chamber. The temperature in the lower part of the chamber will be about 500° to 520° C., while the temperature at the top of the bed will be about 475° C., i. e. that of the inflowing particles from chamber 3. The depth of the chambers is such as to allow sufficient contact time, on the order of about 1 to 5 seconds or more, for completion of the reactions in the respective chambers at the rates of flow of the gases and of the moving bed of contact mass that are established therein. An adjustment of the relative rates of flow of feed gases and moving bed, made at the start of the operation, may be maintained with little or no change through subsequent operation. The reaction gases collected in space 25 and withdrawn through pipe 27 consist substantially of chlorine and unreacted oxygen, as well as nitrogen when air is used as the oxidizing gas. The exit gases may be treated in any known way to separate chlorine from the accompanying gases and to purify it.

The hot oxidized particles of the contact mass are discharged through leg 10 and conduit 16 into the base of air lift pipe 17, in which they are elevated to separator 19, whence they pass through conduit 20 to chamber 2. Small amounts of dust accompanying the particles are separated in separator 19, and carried off by the exit air to dust collector 22. In our experience with the use of a contact mass deposited on a durable carrier, the dust loss should be less than one pound per ton of chlorine produced. By using air at normal temperature to operate the air lift a certain amount of cooling of the hot oxidized particles is effected. In case, however, the particles entering chamber 2 are hotter than desired, they may be further cooled by passing cool air through them, which is admitted through pipe 30, and the heated air is withdrawn through pipe 31. The temperature of the particles leaving chamber 2 at the bottom and entering chamber 3 at the top should be the same as that desired for operation in chamber 3, i. e. about 350° to 400° C. Should mechanical or other losses of the particles of contact mass eventually reduce the circulating inventory thereof below the desired point, additions of fresh particles can be made as needed through feed inlet 13.

The continuous mode of operation, with recirculation of the contact mass particles, as described, affords numerous advantages as compared with the operation of a stationary bed, in addition to the obvious advantage of replacing an alternating or periodic mode of operation. By use of the moving bed of contact particles a more or less automatic compensation for and correction of variations from some prescribed operating conditions is attained. Thus, any tendency for losses of ferric chloride by vaporization is largely counteracted by the fact that the vapors rising from a hotter part of either chamber 3 or 4 must pass through a lower temperature zone in the chamber, where they are reabsorbed by the particles, before they can escape with the off-gases. According to our observations, vaporization losses of ferric chloride should not exceed one to two pounds per ton of chlorine produced.

Another advantage is that in each reaction zone the fresh gaseous reactant comes into contact with the nearly reacted particles shortly before they leave the zone, thus tending to complete the conversion of the ferric compound to the highest practicable degree, while, as the gas becomes progressively exhausted in passing through the bed in the chamber, it constantly comes in contact with particles which are richer in the ferric compound that is to be converted. Likewise the temperature within either chamber not only is readily susceptible to control but also covers a range in the direction from the cooler region at the top to the hotter region at the bottom within which the most favorable temperature conditions may shift as the reaction progresses.

The proportions of the components of the contact mass can be varied considerably without great variation in its effectiveness. Considering the mass in its fully chloridized state, the mol ratio $KCl/FeCl_3$ is preferably between 1/1 and 2/1. When less than 1 mol KCl is used per mol $FeCl_3$, the vaporization losses of $FeCl_3$ at the temperature of the oxidizing reaction increase rapidly with decrease in the proportion of the depressant. On the other hand, when more than 2 molar proportions of KCl are used, the activity of the mass decreases with increasing ratio of KCl. In general we prefer to use about 1.25 mols KCl per mol FeCl₃. As to the promoter, the chlorides of copper, cobalt and nickel, CuCl₂, CoCl₂ and NiCl₂, appear to be most effective, but from the cost standpoint we prefer to use CuCl₂. The mol ratio CuCl₂/FeCl₃ may vary from 0.10/1 to 1/1 without significant change in the activity of the mass, but either more or less of the promoter may be used. A satisfactory ratio is about 0.5 mol CuCl₂ per mol FeCl₃. As carrier a porous inert refractory material is required which is resistant to the reaction gases at the temperatures employed, and which is sufficiently hard and durable to resist attrition. Such materials are mainly siliceous in character. Particularly desirable are certain grades of silica fire brick, or diatomaceous earth products sold under the names of Celite and Sil-o-cel. The carrier is crushed and sized to particle sizes preferably between about 6 and 20 mesh. A representative formula is the following:

| Component | Wt. Per Cent | Mol Ratio |
|---|---|---|
| FeCl₃ | 33.3 | 1.0 |
| KCl | 19.3 | 1.25 |
| CuCl₂ | 14.0 | 0.5 |
| Celite C-22, 6-20 mesh | 33.4 | |

The contact mass has been described as in its fully chloridized state, and it is most readily, though not necessarily, prepared in that state. For the purpose a quantity of the siliceous carrier particles is placed in a rotating cylindrical vessel, and a solution of the selected metal chlorides in desired proportion is added to the revolving mass of particles at a temperature sufficient to vaporize the water. After the solution has been added, rotation of the cylinder is continued at an elevated temperature, say, up to 300° C., until the removal of water is complete, after which the mass is removed from the vessel, cooled and, if necessary, screened to separate the desired particle sizes.

Operating in the manner and with the contact mass above described, and using oxygen as the oxidizing gas, we have been successful in producing a product gas containing as much as 99.7 per cent of chlorine directly and without purification. Using air as the oxidizing gas, we have obtained a product gas directly containing from 30 to 32 per cent of chlorine. A typical analysis of such latter gas is as follows:

| Component | Vol. Per Cent |
|---|---|
| Cl₂ | 32.0 |
| O₂ | 1.5 |
| N₂ | 66.5 |
| HCl | nil |
| H₂O | nil |

The overall conversion of HCl to Cl₂ varies with the efficiency of the chloridizing reaction. We have obtained an efficiency as high as 98 per cent, and efficiencies in the range of 90 to 95 per cent are to be expected in normal operation.

The following examples are illustrative of the results that we have obtained in the practice of our invention, but are not to be considered as limiting the same.

In an apparatus similar to that herein described, employing a contact mass of the specific formula shown above, a series of runs was made in the manner described, with provision for continuous measurement of temperature at the bottom and at the top of the chloridizing zone and of the oxidation zone, and for continuous sampling and analysis of the exit gas from each zone.

The diameter of the column of contact particles in the chloridizing and the oxidizing zones was 4 inches, and the depth of the column in each zone was approximately 27 inches. Air was used as the oxidizing gas. Over a period of 7 hours, hydrogen chloride, preheated sufficiently to maintain the reaction temperature, was fed to the chloridizing zone at a rate starting at 55 mols per hour and gradually increasing to 59 mols per hour.

The rate of travel of the vertically moving bed of the contact mass was approximately 5 liters per hour as measured by the quantity discharged at the bottom of the oxidizing zone into the air lift. The temperature at the top of the chloridizing zone varied over the period from 375° to 420° C., averaging about 400° C., and at the bottom it varied from 435° to 495° C., averaging about 460° C. The temperature of the oxidizing zone at the top varied from 445° to 490° C., averaging about 460° C., and at the bottom it varied from 470° to 550° C., averaging about 500° C. The percentage absorption of hydrogen chloride in the chloridizing zone varied from 92 per cent to 98 per cent, the average being 95 per cent. The strength of the chlorine gas taken off from the oxidation zone was 25 per cent at the start, rapidly increasing to 30 per cent and thence varying from 30 per cent to 32.5 per cent, with the average being about 31 per cent.

In another measured run, with the same apparatus and contact mass, hydrogen chloride was fed at the rate of 55 mols per hour over a period of 5 hours. The temperature at the top of the chloridizing zone varied from 330° to 380° C., with an average of about 360° C., while at the bottom of the zone it varied from 410° to 470° C., with an average of about 430° C. In the oxidizing zone the temperature at the top varied from 400° to 460° C., with an average of about 430° C., and at the bottom it varied from 450° to 510° C., averaging about 470° C. The absorption of hydrogen chloride in the chloridizing zone varied from 88 per cent to 97 per cent, averaging about 95 per cent. The strength of the chlorine gas in the product started at 21 per cent, rose rapidly to 32 per cent, and averaged 30 per cent during the run.

Without interrupting the foregoing operation, the rate of feed of hydrogen chloride was increased to 64 mols per hour without change of heat input to the apparatus, which had the effect of lowering the temperature in both zones of operation. The run was continued at this rate for 4 hours. The temperature in the chloridizing zone at the top varied from 325° to 360° C., with an average of about 340° C., and at the bottom it varied from 390° to 425° C., with an average of about 405° C. In the oxidizing zone the temperature at the top varied from 380° to 430° C., averaging about 405° C., and at the bottom it varied from 410° to 450° C., averaging about 430° C. The absorption of hydrogen chloride in the chloridizing zone varied from 92 to 95 per cent, with an average of about 93 per cent. The strength of the chlorine product gas averaged about 30 per cent, with practically no variation.

The average temperatures and results of the foregoing runs are tabulated as follows:

| No. | Temperature, °C. | | | | Per Cent HCl Reacted | Per Cent Cl₂ in Prod. |
|---|---|---|---|---|---|---|
| | Chloridizing | | Oxidizing | | | |
| | Top | Bottom | Top | Bottom | | |
| 1 | 400 | 460 | 460 | 500 | 95 | 31 |
| 2 | 360 | 430 | 430 | 470 | 95 | 30 |
| 3 | 340 | 405 | 405 | 430 | 93 | 30 |

As will be seen from the foregoing description, in a particular case the temperature range in the oxidizing zone is higher than in the chloridizing zone. The overall operating temperature ranges for employment in the respective zones, however, overlap to a considerable extent. Thus, an operative temperature range for use in the chloridizing zone is about 300° to 500° C., with a narrower preferred range of about 350° to 475° C. For the oxidizing zone a satisfactory overall range is from about 400° to 550° C., with a preferred range between 425° and 500° C. Temperatures both lower and higher than those stated may be used in each of the zones, but with diminished utility, because of loss of yield and lowered effectiveness of the contact mass. It is one of the advantages of our improved process that a fair range of temperature is readily maintained in each of the reactions, which may be on the low side at the inlet end for the moving bed of contact mass, and somewhat on the high side at the outlet end of the zone, but which includes within the range the temperatures most favorable to the reaction. The transitory passage of the moving contact mass in either zone through a higher temperature region toward the outlet from the zone does not materially affect the yield of product.

By operating in the continuous manner herein described, it is unnecessary that the conversion of the contact mass be complete in either reaction stage. In other words, neither the conversion of ferric oxide to the chloride, nor of the chloride to the oxide, in the respective stages needs be carried out quantitatively in order to secure the high yields shown. All that is required is that the gas flow in either stage be adjusted to the flow of the contact mass, so that the composition of the exit gases corresponds to the expected degree of conversion. This can be determined by analysis of the exit gases without considering or determining the actual degree of conversion of the iron compound in the mass in either stage. Thus, a wide latitude is allowed in the control of the operation without affecting the economy of the process.

The invention may be practiced advantageously with hydrogen chloride recovered from organic chlorination processes without more than the usual purification which results from separation of the organic chloride products of such processes. Thus, in the organic chlorination process the chlorinated products are condensed and separated from gaseous products including hydrogen chloride, and the latter may be used directly as hydrogen chloride feed gas for the process of the present invention. In some cases, as in processes of methane chlorination, where the uncondensed product gases may contain a substantial amount of methane as well as hydrogen chloride, such gases can be used as feed for our process in the chloridizing stage without extensive decomposition of the methane, and the methane after the removal of hydrogen chloride in the chloridizing reaction, may then be dried and returned to the chlorination process.

We claim:

1. The process of making chlorine from hydrogen chloride, which comprises causing a body of a granular reactive contact mass to flow by gravity as a continuous moving bed successively through a chloridizing zone and an oxidizing zone, said contact mass being introduced into the chloridizing zone in oxidized condition and into the oxidizing zone in chloridized condition, and in its fully chloridized condition being composed of ferric chloride, potassium chloride and a chloride of a metal from the group consisting of copper, cobalt and nickel in the proportions of 1 to 2 mols of KCl and 0.1 to 1 mol of the metal chloride per mol of FeCl₃, said chlorides being deposited on an inert porous granular carrier, in said chloridizing zone passing a stream of hydrogen chloride in countercurrent to the moving bed of the contact mass, while maintaining said zone in a temperature range increasing from the top to the bottom between the limits of about 300° C. at the top and 500° C. at the bottom, to chloridize the contact mass in accordance with the equation;

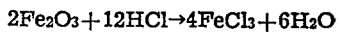

$$2Fe_2O_3 + 12HCl \rightarrow 4FeCl_3 + 6H_2O$$

in said oxidizing zone passing a stream of oxygen-containing gas in countercurrent to the chloridized contact mass, while maintaining said zone in a temperature range increasing from the top to the bottom between the limits of the inlet temperature of the contact mass entering the zone at the top and about 550° C. at the bottom, to oxidize the chloridized contact mass in accordance with the equation;

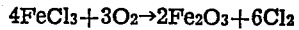

$$4FeCl_3 + 3O_2 \rightarrow 2Fe_2O_3 + 6Cl_2$$

continuously removing a product gas rich in chlorine from the top of said oxidizing zone, continuously removing contact mass particles from the moving bed at the bottom of the oxidizing zone and returning such particles as feed to the top of the chloridizing zone.

2. Process according to claim 1, in which the contact mass contains iron, potassium and copper in approximately the atomic proportions of 1 Fe, 1 to 2 K and 0.1 to 1 Cu.

3. Process according to claim 1, in which the carrier component of the contact mass consists of porous granular particles of diatomaceous earth.

4. Process according to claim 1, in which the oxygen-containing gas is air.

DAVID J. PYE.
WILLIAM J. JOSEPH.

REFERENCES CITED

The following references are of record in the file of this patent:

UNITED STATES PATENTS

| Number | Name | Date |
|---|---|---|
| 2,206,399 | Grosvenor et al. | July 2, 1940 |
| 2,256,969 | Barr | Sept. 23, 1941 |
| 2,340,878 | Holt et al. | Feb. 8, 1944 |
| 2,387,378 | Wolk | Oct. 23, 1945 |
| 2,412,917 | Simpson et al. | Dec. 17, 1946 |
| 2,418,930 | Gorin | Apr. 15, 1947 |
| 2,436,870 | Murphree | Mar. 2, 1948 |